United States Patent
Colosimo

(10) Patent No.: US 12,115,717 B2
(45) Date of Patent: Oct. 15, 2024

(54) APPARATUS FOR PRODUCING A STRUCTURE IN SPACE BY RADIAL EXTRUSION OF HEATED FEESTOCK

(71) Applicant: BAE Systems plc, London (GB)

(72) Inventor: Nicholas Giacomo Robert Colosimo, Preston (GB)

(73) Assignee: BAE Systems plc, London (GB)

(*) Notice: Subject to any disclaimer, the term of this patent is extended or adjusted under 35 U.S.C. 154(b) by 758 days.

(21) Appl. No.: 17/269,350

(22) PCT Filed: Aug. 28, 2019

(86) PCT No.: PCT/GB2019/052399
§ 371 (c)(1),
(2) Date: Feb. 18, 2021

(87) PCT Pub. No.: WO2020/044035
PCT Pub. Date: Mar. 5, 2020

(65) Prior Publication Data
US 2021/0308768 A1     Oct. 7, 2021

(30) Foreign Application Priority Data

Aug. 29, 2018 (EP) ...................................... 18275135
Aug. 29, 2018 (GB) ...................................... 1814043

(51) Int. Cl.
  *B29C 64/118*     (2017.01)
  *B22F 10/22*      (2021.01)
  (Continued)

(52) U.S. Cl.
  CPC ............ *B29C 64/118* (2017.08); *B22F 10/22* (2021.01); *B22F 10/30* (2021.01); *B22F 12/10* (2021.01);
  (Continued)

(58) Field of Classification Search
  CPC ........... B64G 1/10; B64G 4/00; B29C 64/118; B33Y 10/00
  (Continued)

(56) References Cited

U.S. PATENT DOCUMENTS 10,654,596 B1 *  5/2020  Eller ........................ B64G 1/66
10,819,038 B2 * 10/2020  Taylor .................. H01Q 15/141
(Continued)

FOREIGN PATENT DOCUMENTS

JP      S6032412 A    2/1985
JP      S6124305 A    2/1986
(Continued)

OTHER PUBLICATIONS

Hristov, H.D. (2016). Fresnel Zone Plate Antenna. In: Chen, Z. (eds) Handbook of Antenna Technologies. Springer, Singapore. https://doi.org/10.1007/978-981-4560-75-7_42-2 (last visited Apr. 29, 2024). (Year: 2016).*
(Continued)

*Primary Examiner* — Brady W Frazier
(74) *Attorney, Agent, or Firm* — Maine Cernota & Curran

(57) ABSTRACT

Apparatus (100) for use in space, the apparatus (100) comprising: a feedstock storage module (108) for storing a feedstock; a heating module (110) coupled to the feedstock storage module (108) and configured to heat the feedstock; an extrusion nozzle (112) coupled to the heating module (110) and configured to extrude heated feedstock from the apparatus (110); and one or more thrusters (118) configured to provide a propulsive force to the apparatus (100).

15 Claims, 3 Drawing Sheets

(51) Int. Cl.
    *B22F 10/30*           (2021.01)
    *B22F 12/00*           (2021.01)
    *B22F 12/10*           (2021.01)
    *B22F 12/13*           (2021.01)
    *B22F 12/53*           (2021.01)
    *B33Y 10/00*           (2015.01)
    *B33Y 30/00*           (2015.01)
    *B33Y 40/00*           (2020.01)
    *B64G 1/10*            (2006.01)
    *B64G 4/00*            (2006.01)
    *H01Q 1/24*            (2006.01)
    *H01Q 1/28*            (2006.01)
    *H01Q 15/02*           (2006.01)
    *B22F 10/85*           (2021.01)
    *B22F 12/20*           (2021.01)
    *B33Y 50/02*           (2015.01)

(52) U.S. Cl.
    CPC ............ *B22F 12/13* (2021.01); *B22F 12/226* (2021.01); *B22F 12/53* (2021.01); *B33Y 10/00* (2014.12); *B33Y 30/00* (2014.12); *B33Y 40/00* (2014.12); *B64G 1/10* (2013.01); *B64G 4/00* (2013.01); *H01Q 1/24* (2013.01); *H01Q 1/288* (2013.01); *H01Q 15/02* (2013.01); *B22F 10/85* (2021.01); *B22F 12/20* (2021.01); *B33Y 50/02* (2014.12)

(58) Field of Classification Search
    USPC ....................................................... 244/171.1
    See application file for complete search history.

(56) References Cited

U.S. PATENT DOCUMENTS

| | | | | |
|---|---|---|---|---|
| 10,906,290 | B2* | 2/2021 | Yerazunis | ................ B64G 1/66 |
| 11,014,303 | B1* | 5/2021 | Higham | ................ B29C 64/118 |
| 2015/0076732 | A1* | 3/2015 | Kemmer | ............... B29C 64/118 |
| | | | | 425/375 |
| 2015/0209978 | A1* | 7/2015 | Snyder | ................... B33Y 40/00 |
| | | | | 425/162 |
| 2015/0210408 | A1 | 7/2015 | Dunn et al. | |
| 2016/0185472 | A1 | 6/2016 | Blincow | |
| 2017/0036783 | A1 | 2/2017 | Snyder | |
| 2017/0282457 | A1* | 10/2017 | Burns | ..................... B33Y 30/00 |
| 2018/0281303 | A1* | 10/2018 | Yerazunis | ............. B29C 64/118 |

FOREIGN PATENT DOCUMENTS

| | | |
|---|---|---|
| JP | S63284099 A | 11/1988 |
| WO | 2012094678 A2 | 7/2012 |

OTHER PUBLICATIONS

Search Report for Great Britain Patent Appl. No. 1814043.4, mail date Feb. 26, 2019, 5 Pages.

Search Report for Great Britain Patent Appl. No. 1912325.6, mail date Sep. 23, 2019, 5 Pages.

Search Report for European Appl. No. 18275135.4, mail date Feb. 25, 2019, 7 Pages.

International Search Report and Written Opinion for PCT Appl. No. PCT/GB2019/052399, mail date Dec. 2, 2019, 14 Pages.

International Preliminary Report on Patentability for PCT Appl. No. PCT/GB2019/052399, mail date Mar. 11, 2021, 8 Pages.

Zang Hua-Ping et al. "Characterization of Focusing Performance of Spiral Zone Plates with Franctal Structure" Chinese Physics B, 2019, 28(6): 064201.

Huaping Zang et al. "Focusing properties of spiral zone plate based on m-bonacci sequence" Optics Communications, vol. 483 (2021), https://doi.org/10.1016/j.optcom.2020.126638. retrieved from the internet (https://www.sciencedirect.com/science/article/pii/S0030401820310567).

Huaping Zang et al. "Fractal spiral zone plate with high-order harmonics suppression" Applied Optics, vol. 58 Issue 31 pp. 8680-8686 (2019) retrieved from the internet (https://doi.org/10.1364/AO.58.008680).

Anton Nalimov et al. "Optical Sensor Methodology for Measuring Shift, Thickness, Refractive Index and Tilt Angle of Thin Films" Photonics (2023) retrieved from the internet (https://doi.org/10.3390/photonics10060690).

Yonghao Linang et al. "Single-focus spiral zone plates" Optics Letters (2017) vol. 42. Issue 13, retrieved from the internet (https://doi.org/10.1364/OL.42.002663).

"Yi Tao et al.""Study on Focusing Properties of Spiral Zone Plate" Acta Optica Sinica (2012) vol. 32 Issue 7, retrieved from the internet (DOI:10.3788/aos201232.0705004).

J.A.O. Huguenin et al. "Topological defects on moire fringes of spiral zone plates" Journal of the Optical Society of America A vol. 20, Issue 10, pp. 1883-1889 (2003) retrieved from the internet (https://doi.org/10.1364/JOSAA.20.001883).

* cited by examiner

APPARATUS FOR PRODUCING A STRUCTURE IN SPACE BY RADIAL EXTRUSION OF HEATED FEESTOCK

RELATED APPLICATIONS

This application is a national phase application filed under 35 USC § 371 of PCT Application No. PCT/GB2019/052399 with an International filing date of 28 Aug. 2019 which claims priority of GB Patent Application 1814043.4 filed 29 Aug. 2018 and EP Patent Application 18275135.4 filed 29 Aug. 2018. Each of these applications is herein incorporated by reference in its entirety for all purposes.

FIELD OF THE INVENTION

The present invention relates to apparatuses and methods for producing structures, and more particularly to the production, in space, of lenses for antennas.

BACKGROUND

Satellites, such as communications satellites, are used in many different applications including for television, telephone, radio, internet, and military applications. Such satellites may be in a geostationary orbit.

Placing a satellite in orbit, e.g. a geostationary orbit, tends to be costly and complex. Spacecraft tend to be highly limited by both launch volume and mass. When a spacecraft is launched from Earth, it undergoes significant forces which can cause systems on the spacecraft to become non-operational once in space.

SUMMARY OF THE INVENTION

The present inventors have realised that it is desirable to deploy large antennas in space, e.g. in an orbit such as a geostationary orbit. Such large antennas may be relatively narrow beam width, high gain antennas.

The present inventors have further realised that by producing or manufacturing large volume antennas in space, as opposed to on the Earth, lower spacecraft volume tends to be achievable. Furthermore, complex in-space antenna unfurling/unfolding operations may be avoided, thereby reducing the risk of parts failure.

In a first aspect, the present invention provides an apparatus for use in space. The apparatus comprises a feedstock storage module for storing a feedstock, a heating module coupled to the feedstock storage module and configured to heat the feedstock, an extrusion nozzle coupled to the heating module and configured to extrude heated feedstock from the apparatus, and one or more thrusters configured to provide a propulsive force to the apparatus.

In a further aspect, the present invention provides an apparatus for producing an object in space, the apparatus comprising: a feedstock storage module for storing a feedstock; a heating module coupled to the feedstock storage module and configured to heat the feedstock; an extrusion nozzle coupled to the heating module and configured to extrude heated feedstock from the apparatus; one or more thrusters configured to provide a propulsive force to the apparatus; and a controller configured to control the one or more thrusters so as to control a shape of the object.

In any aspect, the apparatus may further comprise a receiver and/or a transmitter. The receiver and/or the transmitter may each be moveable with respect to the extrusion nozzle such that a distance between the receiver and/or the transmitter and the extrusion nozzle may be varied.

The one or more thrusters may be operable to rotate and/or translate the apparatus for use in space. The apparatus may be elongate (e.g. substantially cylindrical) having a longitudinal axis. The one or more thrusters may be operable to rotate the apparatus about the longitudinal axis and/or translate the apparatus in a direction along the longitudinal axis.

The extrusion nozzle may be a radially extending extrusion nozzle. The apparatus may further comprise a further extrusion nozzle coupled to the heating module and configured to extrude heated feedstock from the apparatus. The further extrusion nozzle may be located opposite to the extrusion nozzle and extends in an opposite direction to the extrusion nozzle.

The apparatus may further comprise collection means for retaining material extruded from the extrusion nozzle proximate to the apparatus. The collection means may comprise a robot arm having, as an end effector, a gripper.

The apparatus may further comprise a robot arm having an end effector, the end effector comprising welding means.

The apparatus may be arranged for launch delivery into space.

In a further aspect, the present invention provides a method of producing a structure by an apparatus. The apparatus comprises a feedstock storage module, a heating module, an extrusion nozzle, and one or more thrusters. The method comprises: providing, from the feedstock storage module, feedstock to the heating module; heating, by the heating module, the received feedstock; extruding, from the extrusion nozzle, the heated feedstock; and, while the heated feedstock is being extruded from the extrusion nozzle, providing, by the one or more thrusters, a propulsive force to the apparatus, thereby to cause the apparatus to move.

In a further aspect, the present invention provides a method of producing a structure by an apparatus, the apparatus comprising a feedstock storage module, a heating module, an extrusion nozzle, and one or more thrusters, the method comprising: providing, from the feedstock storage module, feedstock to the heating module; heating, by the heating module, the received feedstock; extruding, from the extrusion nozzle, the heated feedstock; and, while the heated feedstock is being extruded from the extrusion nozzle, providing, by the one or more thrusters, a propulsive force to the apparatus, thereby to cause the apparatus to move; wherein the one or more thrusters are controlled so as to control a shape of the object being produced.

While the heated feedstock is being extruded from the extrusion nozzle, the one or more thrusters may cause the apparatus to rotate, whereby the structure may have a spiral shape. While the heated feedstock is being extruded from the extrusion nozzle, the one or more thrusters may cause the apparatus to translate, whereby the structure may have a conical helix shape.

While the heated feedstock is being extruded from the extrusion nozzle, the one or more thrusters may cause the apparatus to rotate, whereby to cause the structure to have a spiral shape. While the heated feedstock is being extruded from the extrusion nozzle, the one or more thrusters may cause the apparatus to translate, whereby to cause the structure to have a conical helix shape.

In a further aspect, the present invention provides a method of transmitting or receiving a radio signal. The method comprises: producing a structure by an apparatus according to the method of any preceding aspect, wherein the apparatus further comprises a transmitter or a receiver;

and, using the produced structure as a lens, transmitting or receiving a radio signal by the transmitter or the receiver respectively.

DETAILED DESCRIPTION

Figure 1:
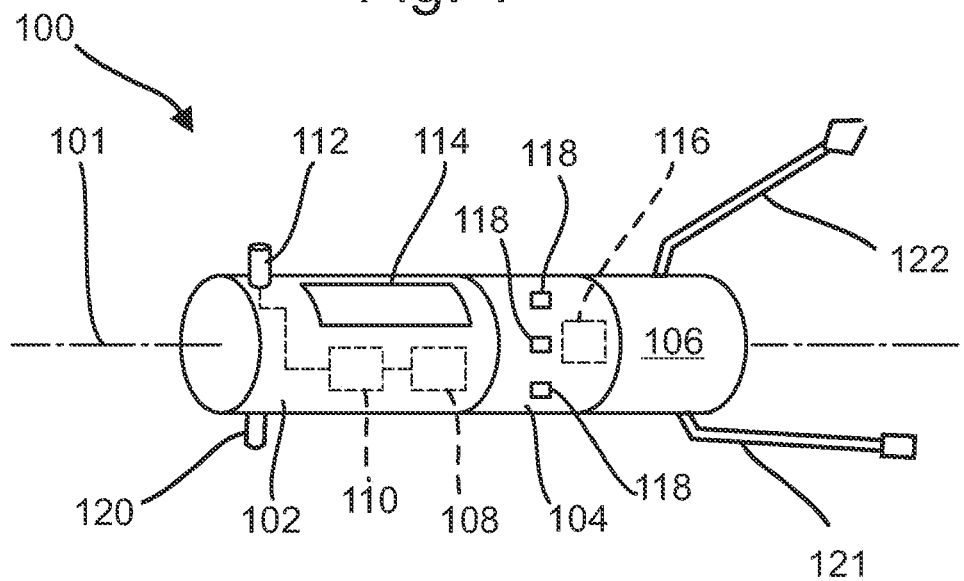
FIG. 1 is a schematic illustration (not to scale) of an antenna apparatus.

FIG. 1 is a schematic illustration (not to scale) of an embodiment of an apparatus, hereinafter referred to as "the antenna apparatus" 100.

The antenna apparatus 100 is used, in space (e.g. in an orbit such as a geostationary orbit), to produce a lens and, in combination with the produced lens, function as an antenna.

The antenna apparatus 100 is generally cylindrical in shape. The antenna apparatus 100 is elongate. A longitudinal axis of the antenna apparatus 100 is indicated in FIG. 1 by the reference numeral 101. The antenna apparatus 100 comprises a manufacturing and power module 102, a systems control module 104, and a transceiver module 106.

The manufacturing and power module 102 is generally cylindrical in shape. The systems control module 104 is generally cylindrical in shape. The transceiver module 106 is generally cylindrical in shape.

The manufacturing and power module 102 is located at a first end of the generally cylindrical antenna apparatus 100. The transceiver module 106 is located at a second end of the generally cylindrical antenna apparatus 100, the second end being opposite to the first end. The systems control module 104 is disposed between the manufacturing and power module 102 and the transceiver module 106.

In this embodiment, the manufacturing and power module 102 comprises a feedstock storage module 108, a heating module 110, an extrusion nozzle 112, and a solar array 114.

The feedstock storage module 108 contains one or more raw materials from which an antenna lens is to be produced. Such raw materials are hereinafter referred to as a "feedstock". In this embodiment, the feedstock is a metal or alloy (e.g. copper or a different electrically conductive material) in powder form. The feedstock storage module 108 is coupled to the heating module 110 and is configured to supply the feedstock to the heating module 110. Operation of the feedstock storage module 108 may be controlled by the systems control module 104.

The heating module 110 is configured to heat the feedstock received from the feedstock storage module 108, thereby to melt the received feedstock. The heating module 110 is coupled to the extrusion nozzle 112. The heating module 110 may be configured to force the molten feedstock through the extrusion nozzle 112. Operation of the heating module 110 may be controlled by the systems control module 104.

The extrusion nozzle 112 extends radially outwards from the substantially cylindrical body of the manufacturing and power module 102. The extrusion nozzle 112 is configured to receive molten feedstock from the heating module 110. The heating module 110 and/or the extrusion nozzle 112 and/or other means is configured to force the molten feedstock through the extrusion nozzle 112, and out of an opening or orifice at a distal end of the extrusion nozzle 112.

The extrusion nozzle 112 may be fixed, i.e. immovable, relative to the substantially cylindrical body of the manufacturing and power module 102. In other words, the extrusion nozzle 112 may have a fixed position relative to the body of the apparatus 100. Thus, in this embodiment, the extrusion nozzle 112 is configured to extrude material in only a single direction relative to the apparatus, that being in a radial direction.

The extrusion nozzle 112 is configured to cool the molten feedstock as the molten feedstock moves through the extrusion nozzle 112, thereby to solidify the feedstock. The solidified feedstock is extruded from the distal end of the extrusion nozzle 112 in a radially outwards direction thereby to form a lens, as described in more detail later below with reference to FIG. 2.

In this embodiment, the cooling and solidification of the feedstock as it is forced through the extrusion nozzle 112 may be caused by exposure of the extrusion nozzle 112 to the operating environment of the antenna apparatus 100 (e.g. outer space). Nevertheless, the extrusion nozzle 112 may be cooled over at least a part of its length by cooling means, e.g. a cooling sleeve. The length of the extrusion nozzle 112 may be designed to provide a predetermined cooling rate for the molten feedstock.

Operation of the extrusion nozzle 112 may be controlled by the systems control module 104.

The opening or orifice of the extrusion nozzle 112 may have any desired diameter. Example diameters for the opening of the extrusion nozzle 112 include, but are not limited to, diameters in the range 0.03 mm-1 mm, e.g. 0.03 mm, 0.04 mm, 0.05 mm, 0.06 mm, 0.07 mm, 0.08 mm, 0.09 mm, 0.1 mm, 0.2 mm, 0.3 mm, 0.4 mm, 0.5 mm, 0.6 mm, 0.7 mm, 0.8 mm, 0.9 mm, 1.0 mm, although other diameters are possible.

The solar array 114 is configured to convert incident sunlight into electricity. The solar array 114 may be a photovoltaic system. The solar array 114 is coupled to other components of the antenna apparatus 100. For example, the solar array 114 may provide electrical power to one or more components selected from the group of components comprising the feedstock storage module 108, the heating module 110, the extrusion nozzle 112, the systems control module 104, and the transceiver module 106.

In this embodiment, the systems control module 104 comprises a controller 116 and a plurality of thrusters 118.

The controller 116 is configured to control operation of other components of the antenna apparatus 100. For example, the controller 116 may control one or more components selected from the group of components comprising the feedstock storage module 108, the heating module 110, the extrusion nozzle 112, the solar array 114, the plurality of thrusters 118, and the transceiver module 106. The controller 116 may receive power from the solar array 114.

The plurality of thrusters 118 are comprised within a reaction control system (RCS) of the antenna apparatus 100. The thrusters 118 are operable to provide attitude control of the antenna apparatus 100 in space. In other words, the thrusters 118 may be used to control the orientation of the antenna apparatus 100 in space with respect to, e.g., an inertial frame of reference or another entity such as the Earth. The thrusters 118 are operable to provide translation control of the antenna apparatus 100 in space.

Figure 2:
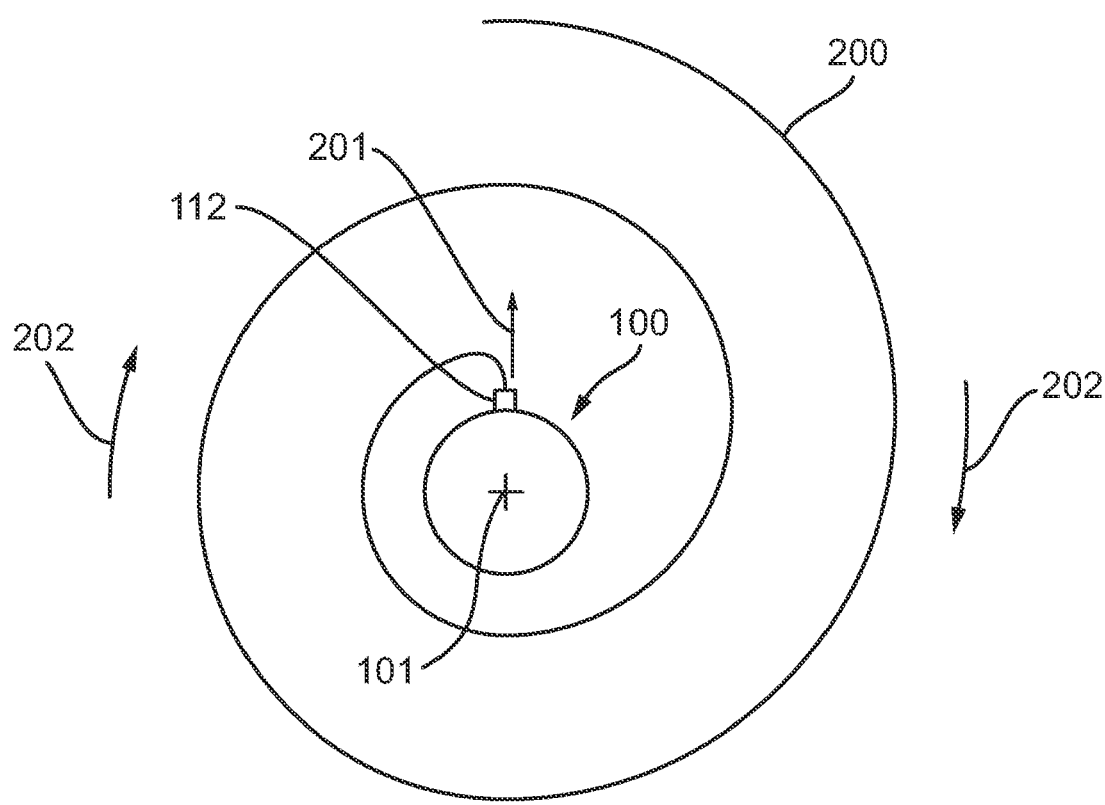
FIG. 2 is a schematic illustration (not to scale) illustrating the production, in space, of a lens by the antenna apparatus.

FIG. 2 is a schematic illustration (not to scale) illustrating the production, in space, of a lens 200 by the antenna apparatus 100. FIG. 2 shows the antenna apparatus 100 when viewed from the first end of the antenna apparatus 100, along the longitudinal axis 101 of the antenna apparatus 100.

In this embodiment, the controller 116 controls the manufacturing and power module 102 to extrude solidified molten feedstock (i.e. a metal) via the extrusion nozzle 112, in the direction of arrow 201, thereby to form the lens 200. In this embodiment, the lens 200 is a diffractive lens, e.g. a Spiral Zone Plate diffractive lens. The lens 200, i.e. the solidified feedstock, is extruded radially. The lens 200 is an elongate, electrically conductive member, e.g. a wire. At and proximate to the point at which the lens 200 exits the extrusion nozzle 112, the lens 200 is malleable. The controller 116 may control, e.g. based on a temperature of the operating environment of the apparatus 100, the heating and cooling of the feedstock by the manufacturing and power module 102 to provide that the lens 200 is malleable where it exits the extrusion nozzle 112.

The controller 116 controls the RCS, including the plurality of thrusters 118, to cause the antenna apparatus 100 to rotate about its longitudinal axis 101 as the lens 200 is extruded from the extrusion nozzle 112. This rotation is indicated in FIG. 2 by arrows and the reference numeral 202.

The rotation of the antenna apparatus 100 about its longitudinal axis 101 causes the malleable portion of the lens 200 to bend. More specifically, a difference in inertia between the extruded lens 200 and the antenna apparatus 100 may cause the malleable portion of the lens 200 (i.e. a recently extruded portion of the lens 200 proximate to the opening of the extrusion nozzle 112) to bend. Thus, the lens 200 is formed into a spiral shape centred about the longitudinal axis.

The material extruded by the extrusion nozzle 112 is extruded directly into space, outside the apparatus, whereby it is cooled and hardens.

In this embodiment, the spiral lens 200 is formed on a flat plane.

Figure 3:
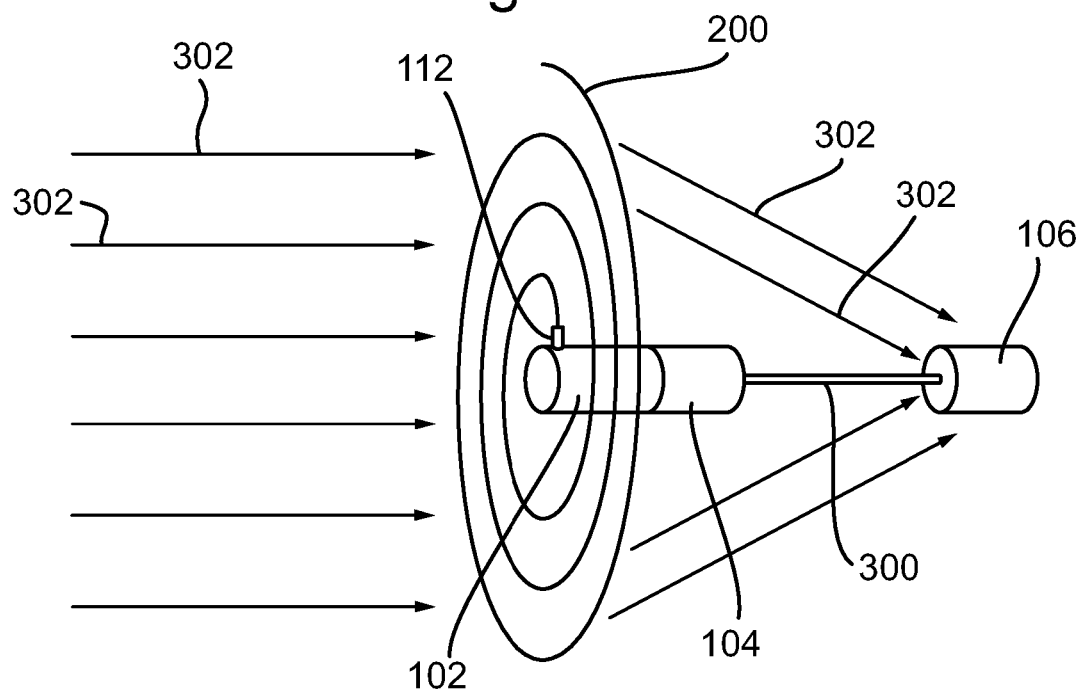
FIG. 3 is a schematic illustration (not to scale) showing the antenna apparatus and the lens in use as a receiving antenna.

FIG. 3 is a schematic illustration (not to scale) showing the antenna apparatus 100 and the lens 200 in use as a receiving antenna.

In this embodiment, the transceiver module 106 is coupled to the other components of the apparatus 100 via an extendible arm 300. In particular, the transceiver module 106 is attached to the systems control module 104 via the extendible arm 300. The extendible arm 300 may be controlled, e.g. by the controller 116, so as to vary its length. Thus, the distance between the transceiver module 106 and the systems control module 104 may be varied. Thus, the distance between the transceiver module 106 and the lens 200 may be varied. The extendible arm 300 may, for example, be a telescopic arm.

In this embodiment, radio waves 302 are incident on the lens 200. The radio waves 302 may have been transmitted from an Earth-based transmitter. The lens 200 focuses the incident radio waves 302 onto the transceiver module 106, e.g. through phase shift and diffraction. The transceiver module 106 comprises a transceiver configured to receive the radio waves 302 focused onto it by the lens 200. Thus, the radio waves 302 are received by the antenna formed by the antenna apparatus 100 and the lens 200.

In this embodiment, the controller 116 is configured to control the extendible arm 300 to position the transceiver module 106 at a focal point of the lens 200. This positioning of the transceiver module 106 by the controller 116 may be performed using, for example, one or more properties of the lens 200 (such as a diameter or pitch of the lens 200) and/or one or more properties of the antenna apparatus 100 (such as an orientation) and/or one or more properties of the radio waves 302 (such as frequency or wavelength). The properties of the lens 200 used to position the transceiver module 106 may be measured by the antenna apparatus 100, or may be determined or inferred by the controller 116 based on the production of the lens 200. The properties of the radio waves 302 may be measured by the antenna apparatus 100, or may be predetermined.

The antenna apparatus 100 and the lens 200 may be used as a transmitting antenna. For example, the transceiver module 106 may include a transmitter configured to send an electrical signal to the lens 200, which is then transmitted as radio waves by the lens 200.

Thus, an antenna module 100 which may be used to produce (e.g. in space) a lens 200 and function as an antenna is provided.

Advantageously, the lens of the above described antenna is fabricated or produced when the antenna module is in space. The volume of the antenna module is lower than that of the in-space antenna (i.e. the antenna apparatus and the lens). Thus, a reduced volume for launch into space is provided. This tends to reduce launch cost.

Furthermore, since the lens is only produced once the antenna apparatus is in space, the likelihood of damage to the lens (e.g. caused by the forces experienced during launch) tends to be reduced or eliminated.

The above described apparatus tends to avoid the use of complex in-space antenna unfurling/unfolding operations.

Advantageously, the above described apparatus tends to allow for the placement of larger antennas in space than can be achieved conventionally.

In the above described methods and apparatus, the shape of the formed object (e.g. the antenna) is defined by movement of the apparatus in space. In some embodiment, the shape of the object may be controlled only by controlling movement (i.e. translation and/or rotation) of the apparatus in space.

In the above embodiments, the lens is formed on a flat plane. However, in other embodiments, the lens is not formed on a flat plane. For example, the lens may be formed about an axis so as to produce a spiral, conical lens, a parabolic reflector, or a helical antenna.

Figure 4:
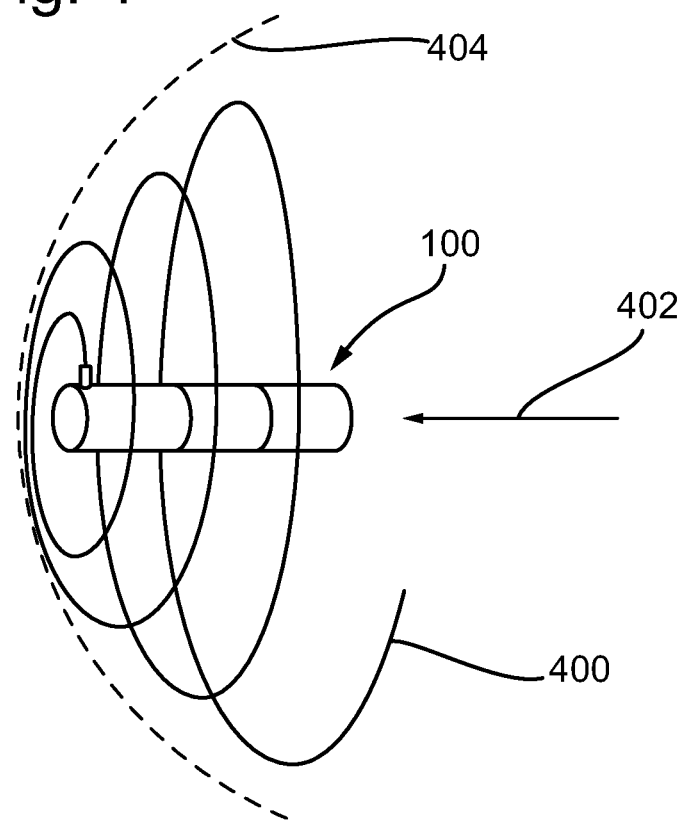
FIG. 4 is a schematic illustration (not to scale) illustrating the production, in space, of a further lens.

By way of example, FIG. 4 is a schematic illustration (not to scale) illustrating the production, in space, of a further lens 400 by the antenna apparatus 100.

In this embodiment, the controller 116 controls the manufacturing and power module 102 to extrude solidified molten feedstock (i.e. a metal) via the extrusion nozzle 112, thereby to form the further lens 400. In the same way as for the lens 200 described in more detail earlier above with reference to FIGS. 2 and 3, as the further lens 400 is extruded from the extrusion nozzle 112, the plurality of thrusters 118 are controlled to cause the antenna apparatus 100 to rotate about its longitudinal axis 101. This rotation causes the further lens 200 to form a spiral shape centred about the longitudinal axis 101. In addition, in this embodiment, the plurality of thrusters 118 are controlled to cause the antenna apparatus 100 to undergo translational movement, i.e. to move in a direction along the longitudinal axis 101, as indicated in FIG. 4 by an arrow and the reference numeral 402. This movement of the antenna apparatus 100 in a direction along the longitudinal axis 101 causes the malleable portion of the further lens 400 to bend in an opposite direction along the longitudinal axis 101. More specifically, a difference in inertia between the extruded lens 400 and the antenna apparatus 100 may cause the malleable portion of the lens 400 (i.e. a recently extruded portion of the lens 400 proximate to the opening of the extrusion nozzle 112) to bend in a direction along the longitudinal axis 101. Thus, the further lens 400 is formed into conic helix about the longitudinal axis 101. The further lens 400 defines a curved surface indicated in FIG. 4 by a dotted line and the reference numeral 404. The further lens 400 may be used as a parabolic reflector.

In the above embodiments, the produced lens remains attached to the antenna module. However, in other embodiments, once produced by the manufacturing and power module, a lens may be detached from the antenna module, e.g. detached from the end of the extrusion nozzle thereby to allow another lens to be produced. In some embodiments, a lens that is detached from the antenna module may be used by a different entity (e.g. a space-based entity remote from the antenna module). In some embodiments, a structure (e.g. a lens) that is detached from the extrusion nozzle may be collected or retained by a different component of the antenna module. For example, with reference again to FIG. 1, the antenna module may include collection means 121, such as a gripper arm or a magnet 121, for collecting a produced and detached lens, and retaining the detached lens proximate to the antenna module.

Thus, the antenna module may be implemented to produce a plurality of lenses or other structures. In some embodiments, the plurality of lenses or structures produced by the antenna module may be coupled together, thereby to produce lens having different properties.

Figure 5:
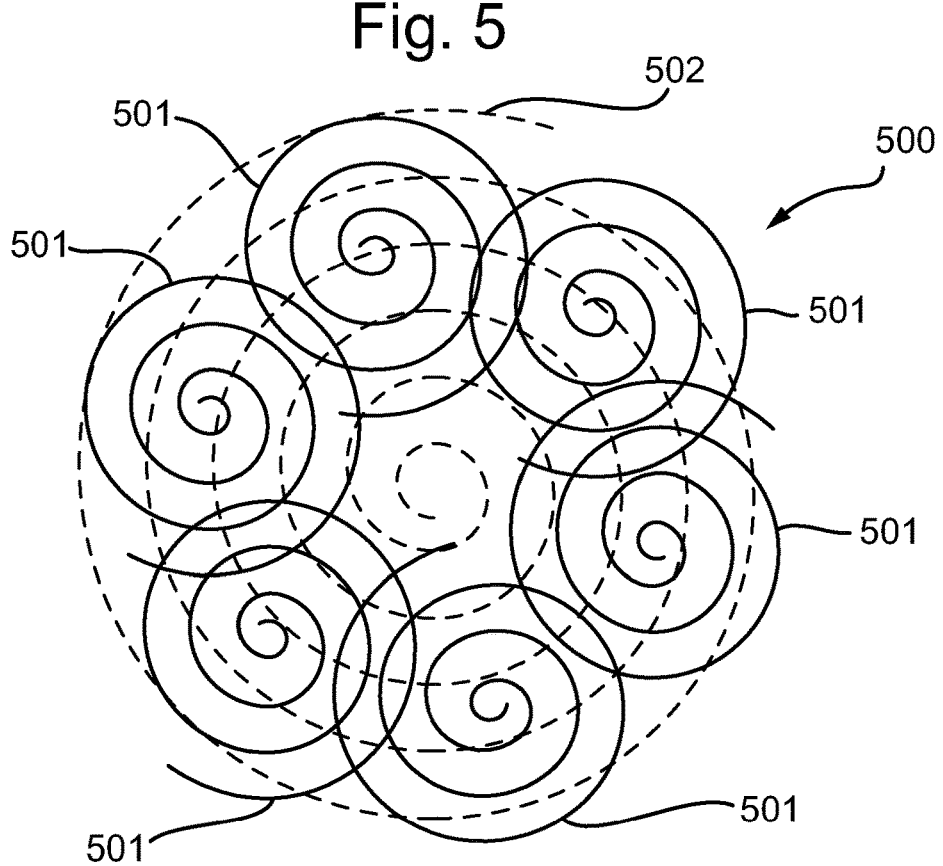
FIG. 5 is a schematic illustration (not to scale) illustrating a second further lens.

By way of example, FIG. 5 is a schematic illustration (not to scale) illustrating a second further lens 500 constructed from a plurality of spiral structures 501, 502. (The spiral structures 501, 502 may themselves be lenses.)

In this embodiment, the second further lens 500 is constructed by the antenna module as follows.

Firstly, a plurality of relatively small spiral structures 501 are produced. The small spiral structures 501 are produced one after the other by the antenna module 100, each small spiral structure 501 being detached from the extrusion nozzle 112 before a subsequent small spiral structure 501 is produced. The small spiral structures 501 may be collected by the antenna module 100 after being produced. The small spiral structures 501 may each be produced in a similar way to that described above for the lens 200 or the further lens 400. The small spiral structures 501 may be substantially identical to each other.

Secondly, a relatively large spiral structure 502 is produced. The large spiral structure 502 may remain attached to the antenna module 100, e.g. to the end of the extrusion nozzle 112. The large spiral structure 502 may be produced in a similar way to that described above for the lens 200 or the further lens 400.

Thirdly, the small spiral structures 501 are attached to the large spiral structure 502 at different respective locations on the large spiral structure 502. The small spiral structures 501 may be spaced apart (e.g. equally spaced apart) along a circle centred about the centre of the large spiral structure 502. The small spiral structures 501 may be attached to the large spiral structure 502 by any appropriate means. For example, the antenna module 100 may comprise a robot arm 122 comprising an end effector, the end effector having welding means for welding the small spiral structures 501 to the large spiral structure 502. The robot arm 122 and end effector may be controlled by the controller 116.

Thus, the antenna module 100 may produce the second further lens 500.

In the above embodiments, the lenses and structures produced by the antenna module are spiral in shape. However, in other embodiments, the antenna module may produce a lens or structure having a different shape, i.e. a shape other than a spiral. The controller may control the RCS, including the plurality of thrusters, to move the antenna apparatus so as to produce a structure having a desired shape. Such movement of the antenna apparatus may include rotation (e.g. roll, pitch, and yaw) and translation (e.g. along three mutually orthogonal axes, x, y, and z, one of which may be the longitudinal axis of the antenna module).

Figure 6:
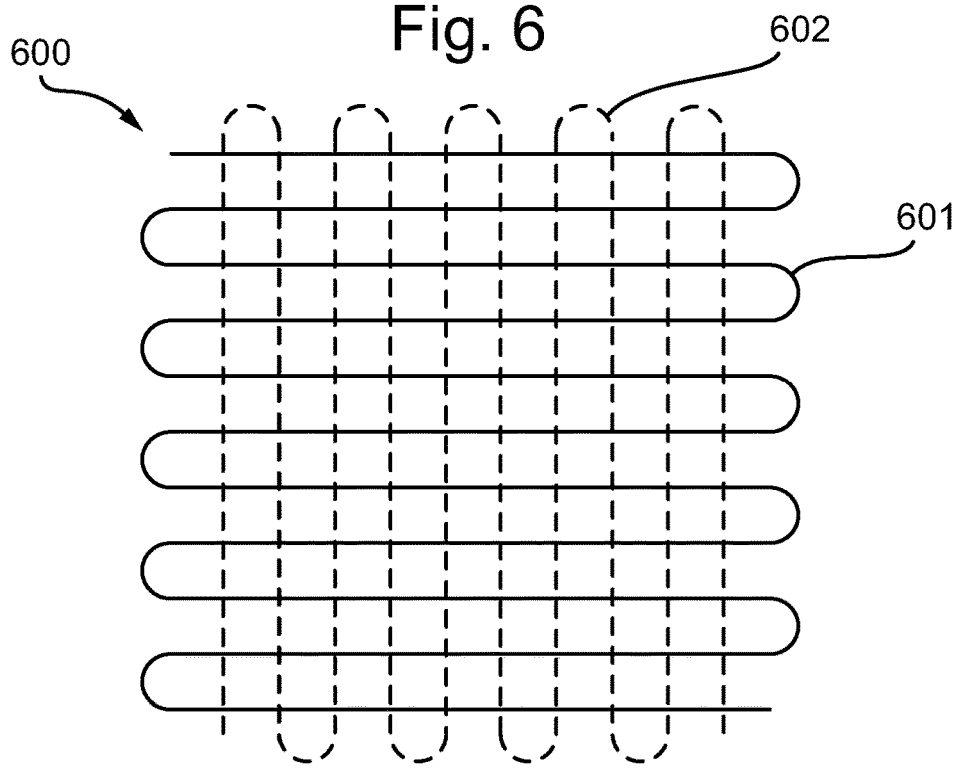
FIG. 6 is a schematic illustration (not to scale) illustrating a third further lens.

By way of example, FIG. 6 is a schematic illustration (not to scale) illustrating a third further lens 600 constructed from a plurality of sub-structures 601, 602. (The sub-structures 601, 602 may themselves be lenses.)

In this embodiment, the third further lens 600 is constructed by the antenna module 100 as follows.

Firstly, a first sub-structure 601 is produced. The first sub-structure 601 is an elongate, wavy structure. The first sub-structure 601 may be produced by the controller 116 controlling the antenna module 100 to move back and forth along the longitudinal axis 101 as material is extruded from the extrusion nozzle 112. The antenna module 100 may be controlled so as not to rotate. The first sub-structure 601 may be detached from the antenna module 100 after it has been formed. The first sub-structure 601 may be collected by the antenna module 100 after being produced.

Secondly, a second sub-structure 602 is produced. The second sub-structure 602 may be substantially identical to the first sub-structure 601, and may be produced in the same way.

Thirdly, the first sub-structure 601 is attached to the second sub-structure 602. The first and second sub-structures 602 may be attached together so that they have different orientations, e.g. such that they are substantially orthogonal. The first and second sub-structures 602 may be attached together by any appropriate means, for example using the above-mentioned robot arm comprising an end effector having a welding means.

Thus, the antenna module 100 may produce the third further lens 600.

In the above embodiments, the feedstock is a metal or alloy. However, in other embodiments, the feedstock is a different material, for example an electrically conductive plastic.

In the above embodiments, the feedstock is in powder form. However, in other embodiments, the feedstock is in a different form other than a powder. For example, the feedstock may be a wire or a solid block of material.

In embodiments, the antenna module comprises a single extrusion nozzle. However, with reference again to FIG. 1, in other embodiments, the antenna nozzle 100 comprises a plurality of extrusion nozzles 112, 120 from which material may be extruded to form a plurality of structures, e.g. lenses. The multiple extrusion nozzles 112, 120 may be controlled to extrude material in parallel (i.e. simultaneously) or in series. In some embodiments, two extrusion nozzles 112, 120 are located at opposite sides of the antenna module. This advantageously tends to provide that, when the two opposing extrusion nozzles 112, 120 are controlled to extrude material at the same time, forces exerted on the antenna module 100 as a result of the extrusion tend to balance, thereby providing improved stability of the antenna module 100, e.g. without a need for any additional mechanical intervention. Preferably, extrusion nozzles are arranged around the apparatus in directly opposing pairs 112, 120. For example, in the case of a cylindrical apparatus, one or more pairs of extrusion nozzles 112, 120 may be present, each pair of extrusion nozzles 112, 120 being diametrically opposed each other. This advantageously tends to balance the system e.g. to allow mesh extrusions to be produced with desired radius of curvature, and e.g. to allow each spiral of extruded material to overlap to create the mesh.

In the above embodiments, the one or more extrusion nozzles are located at or proximate to one end of the apparatus. However, in other embodiments, the one or more extrusion nozzles are located at a different position on the apparatus. Preferably, one or more of the extrusion nozzles (more preferably all of the extrusion nozzles) are located at or proximate to a centre of gravity of the apparatus. For example, the extrusion nozzles may be substantially aligned with the centre of gravity of the apparatus along a longitudinal axis of the apparatus. This advantageously tends to reduce or eliminate any unwanted motion during extrusion of the antenna, which could cause the extruded object to deviate from the desired shape. This may also reduce undesired motion of the cylindrical apparatus.

In the above embodiments, the antenna module is substantially cylindrical in shape. However, in other embodiments, the antenna module has a different shape.

In the above embodiments, the antenna module comprises an extendible arm. However, in other embodiments, the extendible arm is omitted.

In the above embodiments, the antenna module comprises a transceiver module which includes a transmitter and a receiver (e.g. a transceiver). However, in other embodiments, the transceiver module is omitted. In some embodiments, the antenna module comprises only a transmitter and not a receiver. In some embodiments, the antenna module comprises only a receiver and not a transmitter.

In the above embodiments, the antenna module comprises a solar array. However, in other embodiments, the solar array is omitted. In some embodiments, the antenna module comprises a different power source instead of or in addition to the solar array. In some embodiments, the antenna module comprises one or more batteries for providing power on the antenna module.

The invention claimed is:

1. Apparatus for producing an object in space, the apparatus comprising:
   a feedstock storage module for storing a feedstock;
   a heating module coupled to the feedstock storage module and configured to heat the feedstock;
   an extrusion nozzle coupled to the heating module and configured to extrude heated feedstock from the apparatus;
   one or more thrusters configured to provide a propulsive force to the apparatus; and
   a controller configured to control the one or more thrusters so as to control a shape of the object;
   wherein the apparatus comprises instructions stored in non-transient media that, when executed by the controller, cause the one or more thrusters to rotate the apparatus about an axis thereof while the heated feedstock is being extruded from the extrusion nozzle, thereby causing the extruded material to be extended radially outward from the extrusion nozzle due to centrifugal acceleration, so that the object is formed as a continuous, radially extended shape.

2. The apparatus of claim 1, wherein the object is a lens, and wherein the apparatus further comprises a receiver and/or a transmitter configured to receive signals that have been focused by the lens and/or transmit signals using the lens as a transmitting antenna.

3. The apparatus of claim 2, wherein the receiver and/or the transmitter is moveable with respect to the extrusion nozzle such that a distance between the receiver and/or the transmitter and the extrusion nozzle may be varied.

4. The apparatus of claim 1, wherein the one or more thrusters are operable to translate the apparatus for use in space.

5. The apparatus of claim 1, wherein the apparatus is elongate having a longitudinal axis.

6. The apparatus of claim 4, wherein the apparatus is elongate having a longitudinal axis, and wherein the one or more thrusters are operable to rotate the apparatus about the longitudinal axis and/or translate the apparatus in a direction along the longitudinal axis.

7. The apparatus of claim 1, wherein the apparatus is substantially cylindrical.

8. The apparatus of claim 1, wherein the extrusion nozzle is a radially extending extrusion nozzle.

9. The apparatus of claim 1, further comprising:
   a further extrusion nozzle coupled to the heating module and configured to extrude heated feedstock from the apparatus;
   wherein the further extrusion nozzle and the extrusion nozzle extend from the apparatus in opposite directions.

10. The apparatus of claim 1, further comprising a collection mechanism configured for retaining material extruded from the extrusion nozzle proximate to the apparatus.

11. The apparatus of claim 1, further comprising a robot arm having an end effector, the end effector comprising welding means.

12. The apparatus of claim 1, wherein the apparatus is arranged for launch delivery into space.

13. A method of producing a structure, the method comprising:
   providing an apparatus according to claim 1;
   providing, from the feedstock storage module, feedstock to the heating module;
   heating, by the heating module, the received feedstock;
   extruding, from the extrusion nozzle, the heated feedstock; and
   while the heated feedstock is being extruded from the extrusion nozzle,
   providing, by the one or more thrusters, a propulsive force to the apparatus, thereby to cause the apparatus to rotate;
   wherein the one or more thrusters are controlled so as to control a shape of the object being produced.

14. The method of claim 13, wherein, while the heated feedstock is being extruded from the extrusion nozzle, the one or more thrusters cause the apparatus to rotate, whereby to cause the structure to have a spiral shape.

15. The method of claim 14, wherein while the heated feedstock is being extruded from the extrusion nozzle, the one or more thrusters cause the apparatus to translate, whereby to cause the structure to have a conical helix shape.

* * * * *